United States Patent Office 3,100,787
Patented Aug. 13, 1963

3,100,787
BASIC ALUMINUM SALTS OF ACETYLSALICY-
LATE ACID AND A NON-TOXIC WATER SOLU-
BLE ACID
Ludwig Adolph Staib, Jr., Campus Drive, Snyder 26, N.Y.
No Drawing. Filed May 10, 1960, Ser. No. 28,018
12 Claims. (Cl. 260—448)

This invention relates to antacid analgesics for human consumption and, more particularly, relates to aluminum aspirin and to a method for its production.

Aspirin, acetylsalicylic acid, widely recognized for its analgesic properties, is an insoluble acid which may cause gastric disturbances. Due, inter alia, to its insolubility, the acid form of aspirin is not readily transmitted to the intestine where it is absorbed to produce its analgesic action.

Accordingly, in an effort to provide aspirin in a form which does not produce adverse effects and which can be assimilated more readily by the digestive tract, the art has attempted to provide aspirin as a chemical salt. Sodium, potassium, calcium and magnesium salts of aspirin have enjoyed some degree of commercial utilization. While these salts provide substances which act more quickly and effectively than the acetylsalicylic acid itself, nevertheless, these salts tend to be unstable and to result in premature decomposition into acetic acid and salicylic acid during storage. Decomposition imparts a vinegar-like odor and taste to the aspirin and results in a compound which acts as a relatively strong irritant in the stomach. Consequently, the art in large measure has turned to compounds which form the alkali metal or alkaline earth metal salt immediately prior to or during ingestion.

Since aluminum salts of aspirin are comparatively stable, they have been suggested as a possible substitute for the comparatively unstable alkali metal or alkaline earth metal salts. While aluminum aspirins, such as are exemplified in United States Patents 1,967,649, 2,101,867 and 2,698,332, exhibit a relatively high degree of stability, they do not provide a product which exhibits the characteristics of a fast-acting analgesic.

Accordingly, it is a primary object of this invention to provide a fast-acting non-toxic antacid analgesic.

It is an additonal object of this invention to provide an analgesic which exhibits no acid rebound.

It is another object of this invention to provide a fast-acting aluminum aspirin which exhibits an excellent buffering action.

It is a further object of this invention to provide a simplified method for producing a fast-acting aluminum aspirin which is substantially free from uncombined acetylsalicylic acid.

According to the present invention there is provided an aluminum aspirin comprising a compound aluminum salt of acetylsalicylic acid and a non-toxic, water-soluble acid.

The present invention further contemplates an improved method of producing a fast-acting aluminum aspirin composition which comprises reacting an aluminum alcoholate, acetylsalicylic acid, and a material selected from the group consisting of water-soluble acids and the aluminum salts thereof in an inert organic solvent.

The aluminum aspirin of the present invention constitutes a single compound which is a fast-acting analgesic and which also exhibits a buffering action. The water-soluble acid anionic constituent of the salt produces an aspirin readily soluble in the intestinal fluids. The replacement of the anionic groups of the aluminum aspirin composition results in a decrease in stomach acidity and, in the event anionic hydroxyl groups are present in the aspirin salt, these also are readily available to counteract excess acidity in the stomach. Moreover, the method of the present invention permits aluminum aspirin to be produced which is substantially free from unreacted acetylsalicylic acid. Conseqently, the aluminum aspirin produced by the method of the present invention can be ingested without fear of stomach upset which may arise from the ingestion of acetylsalicylic acid. Aluminum aspirin manufactured in accordance with this invention have retained their reactivity even after storage periods of over one and a half years.

Since it will be apparent that an aluminum salt containing even a minor proportion of combined acetylsalicylic acid will exhibit analgesic properties, the invention contemplates the generic concept of the specified aluminum salt composition combined with acetylsalicylic acid. A compound salt containing from about 0.5 mol to about 2.9 mols of acetylsalicylic acid anions per mol of aluminum constitutes a preferred aluminum aspirin.

In addition to acetylsalicylic acid, the aluminum is chemically combined with a non-toxic, water-soluble acid or a mixture of acids. The non-toxic, water-soluble acid employed may be an inorganic acid such as hydrochloric acid, nitric acid, sulfuric acid or the like. Alternatively, the water-soluble acid may be an organic acid such as succinic acid and the like or a hydroxy organic acid such as lactic acid, tartaric acid, citric acid, ascorbic acid or the like. Strong acids having a dissociation constant of at least about $10^{-5}$ are preferred for the practice of this invention. The term water-soluble acid as employed herein denotes those acids which exhibit a solubility of at least about 5 and preferably at least about 10 grams per 100 ml. of water at 20° C.

The aluminum aspirin preferably will contain at least about 0.1 equivalent of water-soluble acid anions per mol of aluminum. Increased proportions of water-soluble acid anions in the salt tend to increase the compatibility of the aluminum aspirin with the stomach fluids. The amount of water-soluble acid anions present desirably will be less than that amount which will provide a product too acid for stomach fluids which generally are characterized by a pH of about 1.2. While strong acids are preferred, nevertheless, their strength will vary sufficiently that no precise single, upper limit can be stated for all cases. Generally, however, the broadly preferred product will contain from about 0.1 to about 2.0 equivalents of water-soluble acid anions.

The preferred upper limit for any given water-soluble acid may be determined by adding the acid to 20 cc. of water until a pH of 3.5 is attained. The number of equivalents of acid present in the solution will be the maximum number of equivalents present in one gram of the product. Stated conversely, the number of equivalents of water-soluble acid present in one gram of the aluminum aspirin product should not reduce the pH of 20 cc. of water to below 3.5.

Since hydroxy-organic acids tend to provide products having a bland taste and which are relatively non-hygroscopic, these acids are generally preferred. Compounds containing hydroxy-organic acids in combination with less than about 0.2 equivalent of chlorine appear to provide a particularly desirable balance with respect to reactivity, taste and hygroscopicity.

In the event the acetylsalicylic acid and the water-soluble acid do not satisfy all the valences of the aluminum, the invention contemplates an aluminum aspirin containing hydroxyl groups in addition to the acetylsalicylic acid and the water-soluble acid. An aluminum aspirin containing acetylsalicylic acid anions, anions of a water-soluble, non-toxic acid and hydroxyl groups chemically combined with aluminum exhibits excellent analgesic and buffering properties. While the proportions of the constituents may be varied to alter the balance between analgesic and anti-acid properties as desired, the aspirin preferably will contain at least about 0.5 mol of acetylsalicylic acid, at least about 0.1 equivalent of water-soluble, non-toxic acid anions and at least about 0.1 equivalent of hydroxyl groups.

The range of ingredients of the aspirin compositions will vary somewhat depending upon the acid employed and the particular results desired. When inorganic acid such as hydrochloric acid supplies the water-soluble acid anions the preferred compositions will contain on the average of about 0.1 to about 0.5 equivalent of acid anions and from about 0.8 to about 2.9 moles of acetylsalicylic acid per mol of aluminum. When an organic hydroxy acid such as lactic acid is employed, preferred compositions will contain from about 0.5 to about 1.9 equivalents of water-soluble acid anions and from about 1.0 to about 2.0 mols of acetylsalicylic acid per mol of aluminum. Aspirin wherein the water-soluble acid anion is supplied by a mixture of lactic acid and hydrochloric acid desirably will contain from about 0.5 to about 2.0 equivalents of water-soluble anions, and from about 1.0 to about 2.4 mols of acetylsalicylic acid per mol of aluminum. All of these preferred aspirin also may contain hydroxy groups.

Many other combinations have been formulated. Each of these is also particularly attractive with respect to one or more of its properties. One preferred aspirin will contain per mol of aluminum from about 0.8 to about 1.2 mols of acetylsalicylic acid, from about 0.9 to about 1.8 equivalents of hydroxyl groups and at least about 0.3 equivalent of water-soluble acid. Another preferred aluminum aspirin will contain per mol of aluminum from about 2.4 to about 2.8 mols of acetylsalicylic acid, from 0 to about 0.4 equivalent of hydroxy groups and at least about 0.2 equivalent of a water-soluble non-toxic acid. Still another preferred aspirin will contain per mol of aluminum from about 1.4 to about 1.8 mols of acetylsalicylic acid, from about 0.7 to about 1.0 equivalent of water-soluble acid, and from about 0.2 to about 0.9 equivalent of hydroxy groups.

The aspirin of this invention most appropriately may be produced by reacting an aluminum alcoholate, acetylsalicylic acid and a material selected from the group consisting of non-toxic, water-soluble acids and aluminum salts thereof, in an inert organic solvent.

The aluminum alcoholates which may be employed in the process of this invention comprise any of the aluminum alcoholates which are readily available to the art. The alcoholates may be, for example, the aluminum salt of ethyl alcohol, propyl alcohol, isopropyl alcohol, butyl alcohol, isobuty alcohol, and the like. Aluminum isopropylate constitutes a preferred material for the practice of the process embodiment of this invention.

While either a water-soluble acid or an aluminum salt thereof generally may be employed in the reaction, water-soluble acids are preferred. The solubility of the reactant, the tendency to cause side reactions and similar considerations will govern the choice of the most appropriate reactant to employ in a given reaction system. While acids, per se, generally are preferred, anhydrous aluminum chloride provides excellent results and constitutes one particularly preferred reactant in the process of the present invention. Hydroxy organic acids in general and lactic acid in particular are also preferred reactants.

The reaction may also be conducted in any suitable inert organic solvent. Benzene, toluene, xylene, chloroform, carbon tetrachloride, ethylene chloride, trichloroethane and the like all constitute satisfactory solvents for the reaction system. Additionally, pentane, hexane, acetone, ethers, alcohols or the like may be admixed with one or more of the above solvents. The solvent does not enter into the reaction and, accordingly, any inert organic solvent may be employed for the reaction. Halogenated hydrocarbon solvents are particularly appropriate for the practice of this invention.

The presence of appreciable quantities of water in the reaction system during the reaction is undesirable. Water tends to hydrolyze aluminum alcoholate to aluminum hydroxide which is not sufficiently reactive to provide the novel aspirin of this invention. Although water may be employed to remove alcoholate groups from the compound salt at later stages of the process, the reaction system initially desirably is maintained substantially free of water until the aluminum alcoholate has reacted with the acid materials of the reaction system.

The reactants may be admixed in any desired sequence. However, in order to minimize the danger of side reactions, it may be desirable to add the water-soluble acid constituent before the acetylsalicylic acid is added to the system. Aluminum chloride, for example, most appropriately is added to the reaction system with cooling before the acetylsalicylic acid is added to the reaction system.

In the event the amount of acetylsalicylic acid and water-soluble acid does not fully satisfy the valences of the aluminum present in the reaction mixture, the invention contemplates the further addition of water to hydrolyze the unreacted alcoholate groups to hydroxyl groups. Hydrolysis readily may be accomplished by adding water to the system and subsequently heating the system at a temperature below about 60° C. While temperatures up to about 70° C. sometimes may be employed, the acetylsalicylic acid tends to decompose and consequently temperatures generally should be maintained below about 60° C.

Even if a substantially completely substituted aluminum aspirin is desired, it has been found advantageous to add a small proportion of water to the reacted mixture to insure removal of any residual alcoholate groups which may remain.

The organic solvent, water and the alcohol resulting from the hydrolysis of the alcoholate readily may be removed from the system by vacuum drying. Again, however, the vacuum drying should be conducted at temperatures below about 60° C. to prevent decomposition of the acetylsalicylic acid.

The above-described reaction is stoichiometric and permits the production of aluminum aspirin which contains substantially no unreacted aceylsalicylic acid. The product, that is, the aluminum aspirin composition containing organic acid anions may be finely ground and suspended in mineral oil and examined with polarized light to demonstrate that the product is substantially free of unreacted aspirin. When examined with a crossed polarizer and analyzer the background is dark and unreacted aspirin is visible as sharp-edged bright objects in the dark field. Examination of the product as described above shows only an insignificant proportion of unreacted aspirin.

From the above it will be apparent that the aluminum aspirin composition contemplated by the present invention may be represented by the average formula $$Al(R_1)_x(R_2)_y(R_3)_z$$

wherein $R_1$ represents an equivalent of a non-toxic, water-soluble acid, $R_2$ represents the anion of acetylsalicylic acid, and $R_3$ represents a hydroxyl group. In a broadly preferred embodiment of this invention the subscript $x$ is at least about 0.1, the subscript $y$ is at least about 0.5, and the subscript $z$ equals $3-(x+y)$. In this broad embodiment $z$ may vary from 0 to about 2.4. The value of subscripts $x$, $y$ and $z$ for additional preferred embodiments will be apparent from the above description.

The following examples are included to describe more fully the practice of the present invention. These specific embodiments are included for illustrative purposes only and in no way are intended to limit the scope of the invention.

*Example 1*

Approximately 800 grams of aluminum isopropoxide were added to 1,000 cc. of chloroform and the mixture was heated to dissolve the aluminum isopropoxide. After cooling the mixture to room temperature, 720 grams of crystalline acetylsalicylic acid were added to produce a slightly opalescent solution which was subjected to vacuum to remove chloroform and isopropyl alcohol. The temperature during evaporation was maintained below 70° C.

The residue resulting from the evaporation was added to 1,000 cc. of chloroform. The mixture was cooled to remove the heat of solution and, after cooling, 80 grams of anhydrous aluminum chloride were added to the mixture. Again, the mixture was subjected to cooling to maintain a low temperature and thereby minimize side reactions. After solution was complete, 400 cc. of water were added and the mixture was subjected to high torque stirring with cooling as necessary. Finally, water, alcohol and chloroform were removed by vacuum drying to yield an aluminum aspirin containing about .88 mol of acetylsalicylic acid anions, about 0.4 equivalent of chlorine, and about 1.8 equivalents of hydroxyl groups per mol of aluminum.

*Example II*

One hundred cc. of benzene were cooled almost to solidification and 8 grams of anhydrous aluminum chloride were added with vigorous stirring. Stirring was continued and 81.6 grams of aluminum isopropoxide were added with continued cooling. Finally, 204 grams of acetylsalicylic acid and 50 cc. of ligroin were added to the mixture with stirring. The mix was slightly opalescent. After standing overnight, 10 cc. of water were added and the mixture was stirred vigorously. Drying under vacuum at 60° C. removed benzene, ligroin, water and isopropyl alcohol to yield an aluminum aspirin containing about 2.46 mols of acetylsalicylic acid anions, about .392 equivalent of chlorine, and about .15 equivalent of hydroxyl groups per mol of aluminum.

*Example III*

Forty grams of aluminum isopropoxide were added with agitation to a mixture of 35 cc. of benzene and 65 cc. of ethyl ether maintained at 20° C. After solution was complete, the mixture was cooled to 5° C. and 4 grams of anhydrous aluminum chloride were added. The addition of 36 grams of acetylsalicylic acid produced a cloudy suspension. The suspension was cooled and an additional 20 grams of aluminum isopropoxide were dissolved therein. The aluminum isopropoxide dissolved slowly and resulted in the separation of a gelatinous layer. The addition of 18 grams of acetylsalicylic acid caused the layer to disappear. Subsequently, 2 grams of anhydrous aluminum chloride were dissolved in the mix, and when the mix had become homogeneous but opalescent, 15 cc. of water were added with vigorous stirring. The resulting thick gel was dried under vacuum at 60° C. to yield an aluminum aspirin which contained about 0.8 mol of acetylsalicylic acid cations, 0.4 equivalent of chlorine, and about 1.8 equivalents of hydroxyl groups per mol of aluminum.

*Example IV*

Eighty grams of aluminum isopropoxide were dissolved in a mixture of 100 cc. of benzene and 50 cc. of ligroin. Thirty-six grames of dry lactic acid were added to the solution with vigorous stirring to produce a thick suspension. Addition of 68 grams of acetylsalicylic acid resulted in a decrease in viscosity with some separation of a supernatant phase. Finally, 20 cc. of water were added with vigorous stirring and the mixture was dried under vacuum at 60° C. The aluminum aspirin so produced contained about 0.96 mol of acetylsalicylic acid, about .832 equivalents of lactic acid, and about 1.2 equivalents of hydroxyl groups per mol of aluminum.

*Example V*

Eight grams of anhydrous alminum chloride and 80 grams of aluminum isopropoxide were dissolved in 75 cc. of benzene and 75 grams of ligroin were added to the mixture. Next, 204 grams of acetylsalicylic acid were added. The mixture was stirred and cooled overnight to maintain a temperature below 60° C. Finally, 20 cc. of water were added with stirring. The initial reaction mixture was sufficient to provide an aluminum aspirin wherein all of the valences of aluminum were satisfied by acetylsalicylic acid residue and chlorine atoms. The water was added as a precaution in case, because of some steric factor, the reaction had not been totally complete. The reactive antacid analgesic contained over 2.5 mols of acetylsalicylic acid and about 0.4 equivalent of chlorine atoms per mol of aluminum.

*Example VI*

Four hundred and eight grams of aluminum isopropoxide were dissolved in 500 cc. of chloroform and a mixture of 180 grams of dried lactic acid in 500 cc. of anhydrous isopropyl alcohol were added to the aluminum isopropoxide solution while the solution was stirred. The mixture was cooled and 360 grams of acetylsalicylic acid were added. Following an additional period of stirring and cooling, 100 grams of water were added. The mixture then was allowed to stand overnight at 45° C. Finally, the mixture was vacuum dried to remove solvent materials and excess water. The reactive antacid contained about 1 mol of acetylsalicylic acid, about 1 equivalent of lactic acid, and about 1 hydroxy equivalent per mol of aluminum.

*Example VII*

Four hundred and eight grams of aluminum isopropoxide were dissolved in 500 cc. of chloroform. A mixture of 90 grams of lactic acid in 250 cc. of anhydrous isopropyl alcohol was added to the solution and after a period of mixing and cooling 360 grams of acetylsalicylic acid were added to the reaction mixture. After continued cooling, 150 cc. of water were added and the reaction mixture was stirred for two hours. The mixture was vacuum dried to provide an analgesic characterized by a content of about 1 mol of acetylsalicylic acid, about 0.5 equivalent of lactic acid, and about 1.5 hydroxy equivalents per mol of aluminum.

*Example VIII*

Four hundred and eight grams of aluminum isopropoxide were dissolved in 500 cc. of chloroform and 500 cc. of anhydrous isopropyl alcohol were added to the solution. Following the addition of 170 grams of ascorbic acid, 360 grams of acetylsalicylic acid were added and the mixture was thoroughly mixed and cooled. Finally, 150 cc. of water were added with vigorous stirring. After 18 hours at 45° C. the mixture was vacuum dried to provide an analgesic containing about 1 mol of acetylsalicylic acid, about 0.5 equivalent of ascorbic acid, and about 1.5 hydroxy equivalents per mol of aluminum.

Since ascorbic acid is photosensitive, the above reaction preferably is conducted in the dark.

*Example IX*

Four hundred and eight grams of aluminum isopropoxide were dissolved in 600 cc. of chloroform and 5 grams of anhydrous aluminum chloride were added to the mixture with vigorous stirring. The mixture was cooled and 180 grams of anhydrous lactic acid were added while the stirring was continued. After the reaction was complete 360 grams of acetylsalicylic acid were added and the mixture was stirred for an additional period. Finally, 200 cc. of water were slowly added to the mixture and after the reaction was complete the solvent and excess water were removed by vacuum drying. The analgesic contained about 1 mol of acetylsalicylic acid, about 0.11 equivalent of chlorine atoms, and about 1 equivalent of lactic acid, and about 0.9 hydroxy equivalent per mol of aluminum.

Example X

In order to demonstrate the antacid activity of the aluminum aspirin of this invention, a test was conducted employing simulated gastric juice. The simulated gastric juice was prepared by dissolving 2 grams of sodium chloride and 3.2 grams of pepsin in 7 milliliters of concentrated hydrochloric acid. The mixture then was diluted with water to 1,000 milliliters. The fluid so prepared conformed to that identified in "U.S. Pharmacopoeia," 15th edition.

Twenty cc. of this simulated gastric juice was placed in a 50 milliliter beaker equipped with pH meters and a stirrer. One gram of the aluminum aspirin produced according to Example III caused the simulated gastric juice to change from an initial pH of about 1.3 to a pH of about 3.3 in 15 seconds.

Example XI

The procedure of Example VI was repeated employing 60 cc. of the simulated gastric juice and 1 gram of the aluminum aspirin of Example III. The pH of the solution changed from about 1.3 to over 3.0 in about 15 seconds.

Since variations of this invention readily will be apparent to those skilled in the art, it is intended that the invention be limited only by the scope of the appended claims.

I claim:

1. An aluminum aspirin composition represented by the average formula $Al(R_1)_x(R_2)_y(R_3)_z$, wherein $R_1$ represents an equivalent of non-toxic, water-soluble acid anion, derived from an acid characterized by a dissociation constant of at least about $10^{-5}$, $R_2$ represents the anion of acetylsalicylic acid, and $R_3$ represents hydroxyl groups, the subscript $x$ is at least about 0.1, the subscript $y$ is at least about 0.5 and the subscript $z$ equals $3-(x+y)$ and is at least about 0.1.

2. The aspirin of claim 1 wherein $x$ is in the range of from about 0.1 to about 2.0.

3. The aspirin of claim 1 wherein $x$ is in the range of from about 0.1 to about 2.0 and $y$ is in the range of from about 0.5 to about 2.8.

4. The aspirin of claim 1 wherein the non-toxic water-soluble acid anion ($R_1$) is supplied by a hydroxy organic acid.

5. The aspirin of claim 4 wherein $x$ is in the range of from about 0.5 to about 1.9 and $y$ is in the range of from about 1.0 to about 2.0.

6. The aspirin of claim 1 wherein the non-toxic water soluble acid anion ($R_1$) is supplied by hydrochloric acid.

7. The aspirin of claim 6 wherein $x$ is in the range of from about 0.1 to about 0.5, $y$ is in the range of from about 0.8 to about 2.8.

8. The aspirin of claim 1 wherein the non-toxic water-soluble acid anion ($R_1$) is supplied by lactic acid.

9. The aspirin of claim 8 wherein $x$ is in the range of from about 0.5 to about 1.9 and $y$ is in the range of from 1.0 to about 2.0.

10. The aspirin of claim 1 wherein the non-toxic water-soluble acid anion ($R_1$) is supplied by a mixture of lactic acid and hydrochloric acid.

11. The aspirin of claim 10 wherein $x$ is in the range of from about 0.5 to about 2.0 and $y$ is in the range of from about 1.0 to about 2.4.

12. The method of producing an aluminum aspirin composition substantially free of unreacted acetylsalicylic acid which comprises admixing in a substantially water-free inert organic solvent an aluminum alcoholate with a material selected from the group consisting of water-soluble non-toxic acids characterized by dissociation constants of at least about $10^{-5}$ and the aluminum salts thereof; adding acetylsalicylic acid to the mixture and thereafter adding water to the mixture and heating at a temperature below about 60° C. to hydrolyze any unreacted alcoholate groups.

References Cited in the file of this patent

UNITED STATES PATENTS

| | | |
|---|---|---|
| 2,698,332 | Beekman et al. | Dec. 28, 1954 |
| 2,959,606 | Mitra | Nov. 8, 1960 |

FOREIGN PATENTS

| | | |
|---|---|---|
| 806,182 | Great Britain | Dec. 23, 1958 |